United States Patent [19]

Hirose

[11] 4,386,833
[45] Jun. 7, 1983

[54] EPI-ILLUMINATION TYPE PROJECTION DEVICE

[75] Inventor: Hideo Hirose, Tokyo, Japan

[73] Assignee: Nippon Kogaku K.K., Tokyo, Japan

[21] Appl. No.: 272,760

[22] Filed: Jun. 11, 1981

[30] Foreign Application Priority Data

Jun. 20, 1980 [JP] Japan ................................ 55/88883

[51] Int. Cl.³ .......................... G03B 21/06; G03B 3/02
[52] U.S. Cl. ...................................... 353/67; 353/101
[58] Field of Search ...................... 353/63–68, 353/39, 101, 100; 350/254; 354/197; 355/55, 60; 352/142

[56] References Cited

U.S. PATENT DOCUMENTS 2,373,928 4/1945 Turrettini .............................. 353/66
2,373,930 4/1945 Turrettini .............................. 353/64
2,853,920 9/1958 Malfeld et al. ................... 353/67 X

FOREIGN PATENT DOCUMENTS 296042 8/1928 United Kingdom ................. 353/39

Primary Examiner—Harry N. Haroian
Attorney, Agent, or Firm—Fitzpatrick, Cella, Harper & Scinto

[57] ABSTRACT

An epi-illumination type projection device for forming a projected image of an object comprises a body having a screen, first and second projection lens means alternately mounted at a predetermined location on the body to form different projected images on the screen, and an illuminating system having a light source and a main condenser lens provided in the body to supply an illuminating light to the object through the projection lens means when each of the projection lens means is positioned at said predetermined location. Each of the first and second projection lens means has an engaging surface engaged with the body at said predetermined location, a beam splitter disposed obliquely with respect to the optical axis of the projection lens means, a convergent lens group provided on that side of the beam splitter which is adjacent to the object, and an auxiliary condenser lens provided laterally of the beam splitter. The distance between the position whereat the beam splitter of the first projection lens intersects the optical axis and the engaging surface of the first projection lens means is equal to the distance between the position whereat the beam splitter of the second projection lens means intersects the optical axis and the engaging surface of the second projection lens means.

13 Claims, 3 Drawing Figures

EPI-ILLUMINATION TYPE PROJECTION DEVICE

BACKGROUND OF THE INVENTION

1. Field of the Invention

This invention relates to an epi-illumination type projection device.

2. Description of the Prior Art

In the epi-illumination type projection device according to the prior art, projection lenses are generally interchangeably provided so that the magnification of the projected image can be selectively changed. However, when the projection lenses are to be changed over, it has been necessary to move the epi-illumination system in order to supply an epi-illuminating light beam to each projection lens. More specifically, the epi-illuminating light to be supplied differs for each projection lens and in order to supply a sufficient illuminating light, it has been necessary to move the entire illuminating system and further to move a condenser lens and a light source along the optical axis so that telecentric illumination may be provided. That is, each time the projection lens is interchanged, it has been necessary to adjust the illuminating system twice and this has meant great cumbersomeness of operation and a great hindrance to quick operation.

SUMMARY OF THE INVENTION

It is an object of the present invention to overcome these disadvantages and to provide an epi-illumination type projection device in which optimal illumination is effected without the necessity of adjusting the epi-illumination device when the projection lens is changed over.

The epi-illumination type projection device according to the present invention has a plurality of projection lenses interchangeably mounted at a predetermined location on the device body to form different projected images, an epi-illuminating light source and a main condenser lens provided in the device body to supply an illuminating light to these projection lenses removably provided at the predetermined location on the device body, each of the projection lenses having a half-mirror disposed obliquely with respect to the optical axis thereof, a convergent lens group provided on the optical axis on that side of the half-mirror which is adjacent to an object to be projected, and an auxiliary condenser lens provided laterally of the half-mirror and on the optical axis bent by the half-mirror. The distance between the position whereat the half-mirror provided in the projection lens intersects the optical axis of that projection lens and the barrel attachment surface which contacts the device body when the projection lens is mounted to the device body is equal in all of the projection lenses. Also, when each projection lens has been provided at the predetermined location on the device body, the light source image by a composite system comprising the main condenser lens on the body side and the auxiliary condenser lens provided in the projection lens is formed at the half-mirror side focus position of the convergent lens group provided on that side of the half-mirror which is adjacent to the object to be projected.

The invention will become more fully apparent from the following detailed description of an embodiment thereof taken in conjunction with the accompanying drawings.

DESCRIPTION OF THE PREFERRED EMBODIMENT

Figure 1:
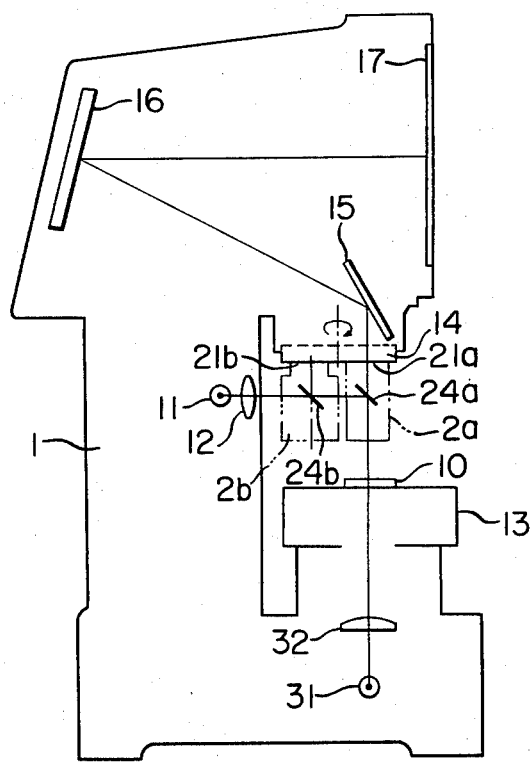
FIG. 1 is a schematic cross-sectional view of an embodiment in which the present invention is applied to a projection inspecting device.

FIG. 1 is a schematic cross-sectional view of an embodiment in which the present invention is applied to a so-called projection inspecting device. As shown, the device body 1 is provided with an epi-illuminating light source 11, a main condenser lens 12, a transmission illuminating light source 31 and a condenser lens 32. A stage 13 movable vertically and horizontally by an unshown means is provided in the lower portion of the device body 1, and a sample material 10 is placed on this stage 13. Also, a well-known rotatable turret mount 14 is provided in the upper portion of the device body 1. On the turret mount 14, a plurality of various projection lenses 2a and 2b are exactly positioned relative to the turret mount 14, i.e., the body 1, by respective barrel attachment surfaces 21a and 21b and are removably provided. By the projection lens 2a located at a predetermined position relative to the body 1, the projected light beam from the sample material 10 is condensed upon a screen 17 via a first reflecting mirror 15 and a second reflecting mirror 16 so that a magnified projected image of the sample material 10 is formed on the screen.

Figure 2:
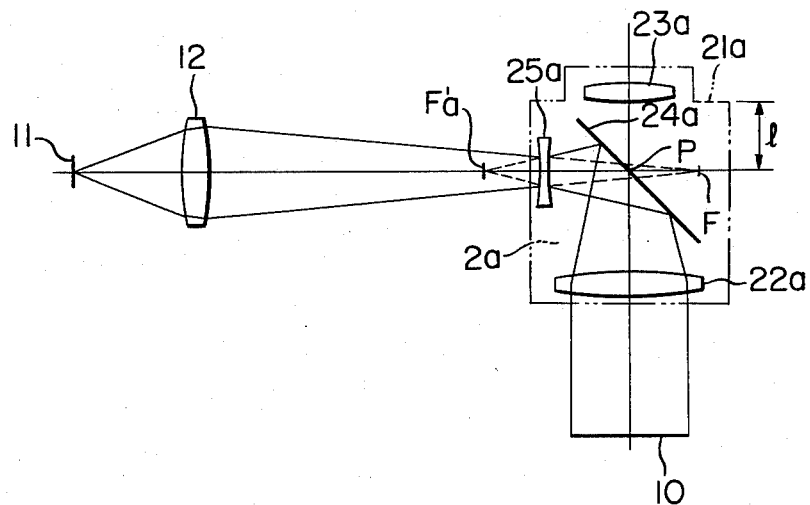
FIG. 2 is a schematic cross-sectional view showing the manner of epi-illumination when a first projection lens has been set to a predetermined position.

FIG. 2 is a schematic cross-sectional view showing the manner of reflection illumination when the first projection lens 2a of lower magnification among the various projection lenses has been set to a predetermined position. As shown, the first projection lens 2a has a convergent forward lens group 22a provided on the side of the sample material as the projected object, a convergent rearward lens group 23a provided rearwardly thereof, and a half-mirror 24a disposed between the two lens groups and provided obliquely with respect to the optical axis, and further has a negative auxiliary condenser lens 25a disposed laterally of the half-mirror 24a and on that side of the body which is adjacent to the light source. In this first projection lens 2a, the position P whereat the half-mirror 24a intersects the optical axis is at a distance l from the barrel attachment surface 21a of this lens barrel. Also, the image of the light source 11 by a composite system comprising the main condenser lens 12 on the body side and the auxiliary condenser lens 25a contained in the projection lens, is formed at the position of the focus Fa' of the convergent forward lens group 22a which is adjacent to the half-mirror 24a, and the epi-illuminating light from the light source 11 arrives at the sample material 10 while becoming a parallel light beam after having left the convergent forward lens group 22a of the projection lens, whereby so-called telecentric illumination is effected.

Figure 3:
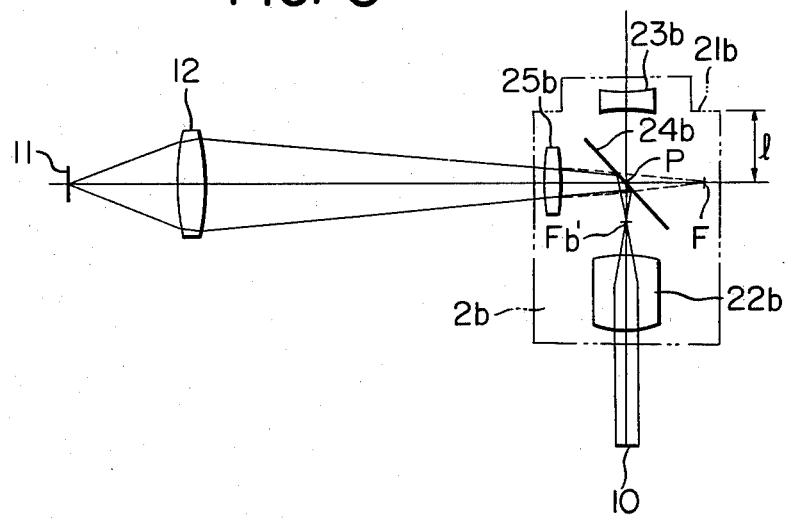
FIG. 3 is a schematic cross-sectional view showing the manner of epi-illumination when a second projection lens has been set to a predetermined position.

FIG. 3 is a schematic cross-sectional view showing the manner of reflection illumination when the second projection lens 2b of higher magnification different from the first projection lens 2a has been set to the same predetermined position as that of the first projection lens 2a previously described, relative to the device body, by rotation of the turret mount. As shown, the second projection lens 2b has a convergent forward lens group 22b provided on the sample material 10 side, a divergent rearward lens group 23b provided rearwardly thereof, a half-mirror 24b obliquely disposed between the two lens groups, and an auxiliary condenser lens 25b provided laterally of the half-mirror. The second projection lens 2b differs from the first projection lens described in connection with FIG. 2 in that the rearward lens group 23b is divergent and that the auxiliary condenser lens 25b is a positive lens. Again in this second projection lens 2b, the position P whereat the half-mirror 24b intersects the optical axis is at a distance l from the barrel attachment surface 21b of this lens barrel, and the image of the light source by a composite system comprising the main condenser lens 12 and the auxiliary condenser lens 25b is formed at the position of the focus Fb' of the convergent forward lens group 22b which is adjacent to the half-mirror 24b, whereby telecentric illumination is effected as in the case of the first projection lens.

Accordingly, even if the first and second projection lenses 2a and 2b are changed over by rotation of the turret mount 14, telecentric reflection illumination is always formed. Therefore, even if the projection lenses are changed, no special adjustment for illumination is required and the light source and main condenser lens on the body side can be fixedly disposed at predetermined positions. Also, if the conjugate relation between the sample material on the stage and the screen is maintained even when the projection lenses are changed over, a different optimal projected image of the same sample material can be obtained very simply by only changing over the projection lenses.

In the above-described embodiment, both the first projection lens 2a and the second projection lens 2b have convergent or divergent rearward lens groups 23a and 23b in addition to convergent forward lens groups 22a and 22b, but the rearward lens groups are not always necessary. Also, in the case of epi-illumination, strictly telecentric illumination need not always be formed and therefore, the position of the light source image by the composite system comprising the main condenser lens on the body side and the auxiliary condenser lens contained in the projection lens may be adjacent to the focus of the forward convergent lens group which is adjacent to the half-mirror, and it is desirable that design be made such that the best condition is provided for each projection lens. Particularly, in the case of a projection lens of high magnification wherein brightness has preference, the position of the light source image can be set so that the illumination is somewhat approximate to condensed illumination. However, even in such a case, no other adjustment than the change-over of the projection lenses need be effected. Further, interchange of the projection lenses is similar not only in the case of a turret mount but also in the case of a single mount.

According to the present invention, as has been described above, adjustment of the epi-illumination device is entirely unnecessary for each change-over of the projection lenses and the operability is remarkably improved while, at the same time, quick operation becomes possible. Moreover, any adjusting means is unnecessary and this leads to great simplicity of the construction of the entire device as well as advantages in manufacture and cost.

It will be appreciated that the epi-illumination type projection device according to the present invention is also usable as a transmission type due to its combination with a transmission illuminating system having a light source 31 and a main condenser lens 32 disposed on the optical axis of the projection lens disposed at a predetermined position as shown in FIG. 1.

I claim:

1. An epi-illumination type projection device for forming a projected image of an object, said device comprising:
   a body having a screen;
   first and second projection lens means alternately mounted at a predetermined location on said body to form different projected images on said screen;
   each of said first and second projection lens means having an engaging surface engaged with said body at said predetermined location, a beam splitter disposed obliquely with respect to the optical axis of said projection lens means, a convergent lens group provided on that side of said beam splitter which is adjacent to the object, and an auxiliary condenser lens provided laterally of said beam splitter;
   the distance between the position whereat the beam splitter of said first projection lens means intersects the optical axis and said engaging surface of said first projection lens means being equal to the distance between the position whereat the beam splitter of said second projection lens means intersects the optical axis and said engaging surface of said second projection lens means; and
   an illuminating system having a light source and a main condenser lens provided in said body to supply an illuminating light to the object through said projection lens means when each of said projection lens means is positioned at said predetermined location.

2. An epi-illumination type projection device according to claim 1, wherein said light source and said main condenser lens are disposed so that when any of said first and said second projection lens means is mounted at the predetermined location on said body, the image of said light source by said main condenser lens and the auxiliary condenser lens of the projection lens means mounted at said predetermined location is formed at or near the focus position of said convergent lens group in said projection lens means which is adjacent to said beam splitter.

3. An epi-illumination type projection device according to claim 2, wherein said auxiliary condenser lens of said first projection lens means is a negative lens.

4. An epi-illumination type projection device according to claim 3, wherein said first projection lens means further has a convergent lens group between said beam splitter and said engaging surface.

5. An epi-illumination type projection device according to claim 2, wherein said auxiliary condenser lens of said second projection lens means is a positive lens.

6. An epi-illumination type projection device according to claim 5, wherein said second projection lens means further has a divergent lens group between said beam splitter and said engaging surface.

7. An epi-illumination type projection device according to claim 2, wherein said body has a turret mount provided rotatably relative to said body, and said first and second projection lens means are removably provided on said turret mount and alternately disposed with respect to said predetermined location on said body by rotation of said turret mount.

8. An epi-illumination type projection device according to any of claims 2 to 7, wherein said body further has a transmission illuminating system for supplying an illuminating light to the projection lens means disposed at said predetermined location from the opposite side of the object.

9. A combination of a first projection objective lens and a second projection objective lens alternately disposed at a predetermined location on a projection device body to form different projected images, each of said first and second projection objective lenses having an engaging surface for engaging said device body, a beam splitter disposed obliquely with respect to each optical axis, a convergent lens group provided on that side of said beam splitter which is adjacent to an object to be projected, and an auxiliary condenser lens provided laterally of said beam splitter, the distance between the position whereat the beam splitter of said first projection objective lens intersects the optical axis thereof and said engaging surface of said first projection objective lens being equal to the distance between the position whereat the beam splitter of said second projection objective lens intersects the optical axis thereof and said engaging surface of said second projection objective lens, whereby whichever of said first and second projection objective lenses is disposed at said predetermined location on said device body, the illuminating light supplied from said device body arrives at the object to be projected through the auxiliary condenser lens, the beam splitter and the convergent lens group of the projection lens disposed at said predetermined location and in any case, excellent illumination can be maintained without any special adjustment.

10. A combination according to claim 9, wherein the auxiliary condenser lens of said first projection objective lens is a negative lens.

11. A combination according to claim 10, wherein said first projection objective lens further has a convergent lens group between said beam splitter and said engaging surface.

12. A combination according to claim 9, wherein the auxiliary condenser lens of said second projection objective lens is a positive lens.

13. A combination according to claim 12, wherein said second projection objective lens further has a divergent lens group between said beam splitter and said engaging surface.

* * * * *

UNITED STATES PATENT AND TRADEMARK OFFICE
CERTIFICATE OF CORRECTION

PATENT NO. : 4,386,833
DATED : June 7, 1983
INVENTOR(S) : Hideo Hirose

It is certified that error appears in the above-identified patent and that said Letters Patent is hereby corrected as shown below:

On the title page, item (30), "Jun. 20" should

-- Jun. 30 --.

Signed and Sealed this

Second Day of August 1983

[SEAL]

Attest:

GERALD J. MOSSINGHOFF

Attesting Officer

Commissioner of Patents and Trademarks